Nov. 19, 1968  J. WIRTH ETAL  3,411,347
VIBRATING STRING FOR MEASURING PURPOSES
Filed Oct. 20, 1965
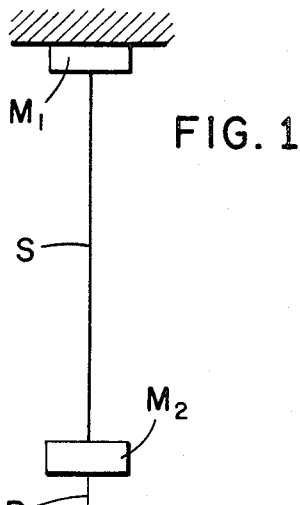
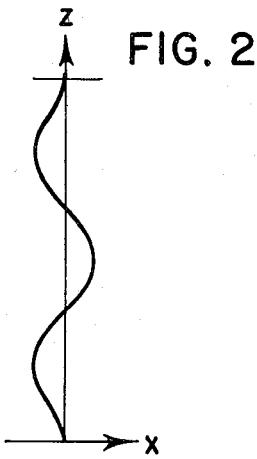
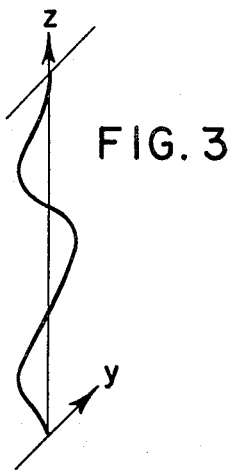
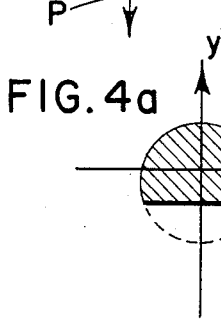
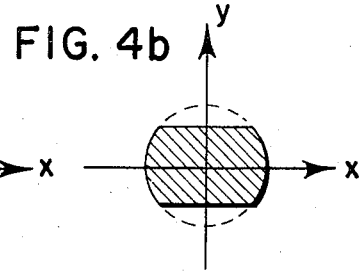
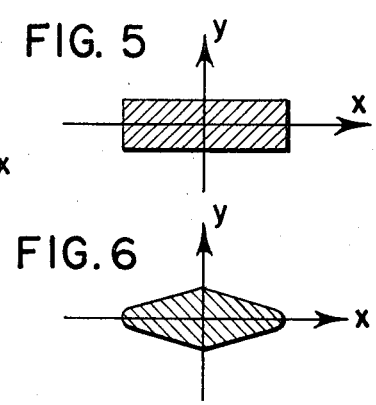
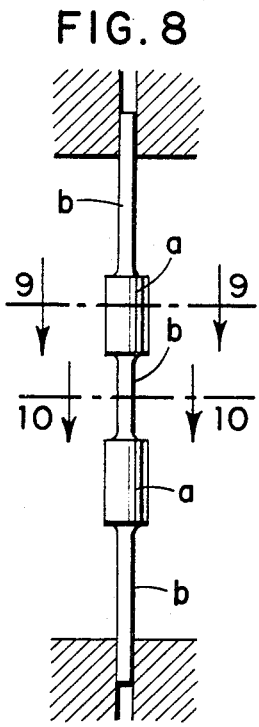
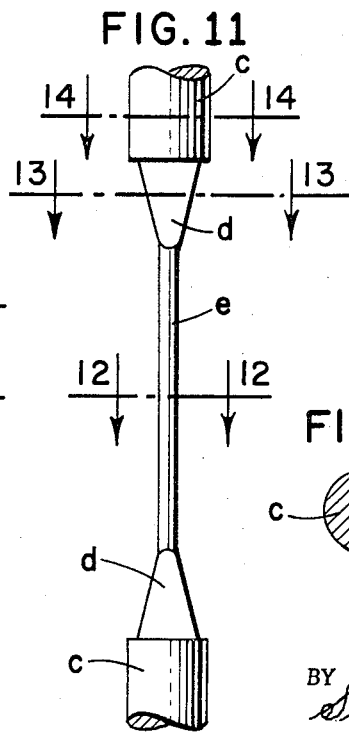
INVENTORS
JOHANNES WIRTH,
MARIO GALLO
BY Stevens, Davis, Miller & Mosher
ATTORNEYS United States Patent Office 3,411,347
Patented Nov. 19, 1968

3,411,347
VIBRATING STRING FOR MEASURING PURPOSES
Johannes Wirth and Mario Gallo, Zurich, Switzerland, assignors to Wirth, Gallo & Co., Zurich, Switzerland
Filed Oct. 20, 1965, Ser. No. 498,914
Claims priority, application Switzerland, Nov. 27, 1964, 15,394
7 Claims. (Cl. 73—141)

ABSTRACT OF THE DISCLOSURE

A string for measurement purposes is mounted to vibrate in a given plane. When the string is set into transverse vibration, the ratio of the axes of the mean ellipse of gyration of the cross section along the length of the string is suitably chosen for two resonant frequencies of like mode, which develop within the measuring range of tensions in the direction of the two bisectors of the ellipse of radiation and one of which is used for the measurement, to differ by more than their respective resonance band widths while remaining between the resonant frequencies of neighboring modes.

---

It is known that when a physical quantity such as a force is arranged to tension a stretched string transversely vibrating in a given plane, the resultant resonant frequency of the string can be used as a measure of the magnitude of said force. In order to obtain a useful result parasitic vibrations must naturally be suppressed. To this end the resonant frequency of the desired transverse vibration—characterized by its mode and direction— should differ by a sufficiently wide margin from the resonant frequencies of other possible vibrations when the tension has a given value or is within a given measuring range. It has been found that if these resonant frequencies are too close together it is possible for a transfer of energy to take place from one mode (the desired) to the other (parasitic) mode merely by mechanical coupling (cf. for instance "Zeitschrift für angewandte Mathematik und Mechanik, vol. 43, Special No., Berlin, 1963, page T81, E. Mettler: Small Vibrations and the Method of Secular Perturbations).

Experience has shown that conventional tensioned strings that are to be used as a frequency standard cannot satisfy stringent requirements with respect to constancy and reproducibility. In this connection it has been discovered that this instability results from minor deviations from circularity of the string cross section, clamping means and connections to weights. Attempts have been made to overcome this instability by improving the roundness of the strings as well as of the clamping means and connections. However, these efforts have not been successful. Strings used for measurement purposes are usually rather short and stiff. This means that the frequency of such a string depends, in a manner that is well understood, not only upon its length, mass and the tension to which it is subjected, but also upon the shape of its cross section and the modulus of elasticity of the material. Cross section and modulus of elasticity of the material of the string impart a given rigidity to the string, that is to say, in the absence of tension the frequency of such a string is not zero as would be suggested by the usual formulae describing the behaviour of such a string. However, the frequency in the absence of longitudinal tension can be calculated from the formulae applying to a rod with rigidly clamped ends.

The present invention relates to a stiff string and this is understood to refer to a string in which because of the inherent stiffness of the string the resonant frequency of the desired vibration when the tension is nil is at least 1% of the resonant frequency under maximum tension.

The stiffness of a string, apart from its modulus of elasticity, depends upon its cross section, or put more precisely, upon the radii of the ellipse of gyration of its cross section. (The radii of gyration of a completely circular or completely regular polygonal string would be equal, and the "ellipse" of gyration would then be a circle.) If the string has a rectangular section the radii of gyration are different and the stiffness across the breadth of the string will exceed that across the width of the string. The frequency of vibrations in planes containing the two different axes will therefore be different irrespectively of the tension (even when this is zero).

A person skilled in the art can calculate these resonant frequencies. Alternatively, they can be experimentally determined with the desired tensile range.

The string of the present invention for measurement purposes is characterized in that when the string is set into transverse vibration the ratio of the axes of the mean ellipse of gyration of the cross section along the length of the string is suitably chosen for the two resonant frequencies of like mode which develop within the measuring range of tensions in the direction of the two bisectors of the ellipse of gyration, and of which one is used for the measurement, to differ by more than their respective resonance band widths, though remaining between the resonant frequencies of neighbouring modes.

Embodiments of the subject matter of the invention are illustratively and schematically shown in the accompanying drawings, in which:

FIGURE 1 is a stretched string;
FIGURE 2 is a third normal mode in one direction;
FIGURE 3 is a resonant vibration;
FIGURES 4a, 4b, to 7 are different cross sections;
FIGURE 8 is a further embodiment of the invention with FIGURES 9 and 10 being sectional views taken along lines 9—9 and 10—10, respectively; and
FIGURE 11 is yet another embodiment of the invention with FIGURES 12 to 14 being sectional views taken along lines 12—12 to 14—14, respectively.

FIGURE 1 shows a string S stretched between a massive rigid anchorage $M_1$ and a mass $M_2$. Compared with the mass of the string S mass $M_2$ is very large and is subjected to a force P. It is known that a string of this kind can be excited by electromagnetic means to vibrate in a plane in a given mode at resonant frequency. An illustration and description of such means is not thought to be necessary.

FIGURE 2 shows a transverse third mode vibration in X-direction. If the string is long and thin and if its modulus of elasticity is very small its tendency to build up parasitic vibrations will likewise be small. However, if it is short and its modulus of elasticity high, and if its cross section is not perfectly round, then as a matter of experience the string will not perform stable vibrations. Amplitude and frequency of the vibration will not remain constant and the vibration itself will not remain in the direction in which it originally started (X in the XS-plane). The string will actually begin to vibrate in a complicated manner both in the $x$ and in the y-directions. The major reasons for this are:

(1) That a string that is accidentally not perfectly round has two radii of gyration which are not exactly alike, and which will generally not (except by pure chance) coincide with the $x$ and $y$ axes (the assumption here being that the $x$-axis is the direction of excitation).

(2) In the direction of the two bisecting diameters of the ellipse of gyration two resonant third mode vibrations of nearly the same frequency will develop when the string is excited. The vibrator may, according to circumstances, excite only one of these vibrations or it may accidentally excite both when the angular orientation of the two bisecting diameters of the ellipse happens to be appropriate.

(3) The two resonant frequencies will be so close that a transfer of energy from one to the other exclusively by mechanical coupling (i.e., without any energy supply from the vibrator) can and will usually take place.

(4) Even if the cross section of a string is rotated in relation to the vibrator in such a way that the direction of excitation ($x$-direction) coincides with one of the bisecting diameters of the ellipse of gyration (which is hardly determinable in the case of accidental deviations from circularity of the cross section) so that only this one resonant vibration (in the $xs$-plane) (FIGURE 3) will be directly impressed upon the string, then the resonant vibration normal thereto (in the $ys$-plane) (FIGURE 3) will also be excited by mechanical coupling and the above mentioned complicated three-dimensional unstable vibration will still develop.

(5) Even if it should be possible to produce perfectly round string cross sections, such strings would have to be geometrically, elastically and inertially joined to the masses to which they are attached in a manner that is circularly perfectly uniform. In practice this can hardly be done.

Whenever vibrations are a planar the following drawbacks therefore arise:

(a) The stability in time of the resonant vibration with respect to amplitude and frequency is unsatisfactory;

(b) The quality of resonance is poor;

(c) The functional relationship between tensile force and resonant frequency is upset.

FIGURES 4a and 4b illustrate cross sections of embodiments of the invention. One or two parallel surfaces on an otherwise circular section uniquely determine the position of the bisecting diameters of the ellipse of gyration and permit the string to be rigidly clamped so that its orientation in relation thereto is precisely determined. If such a string which does not possess the above mentioned drawbacks is excited to a third mode vibration in the $x$-direction in FIGURE 3, then the resultant third mode vibration in $y$-direction in FIGURE 3 is not directly excited because the vibrator is at right angles thereto) and the first vibration will not supply energy by mechanical coupling to excite it because the two resonant frequencies are too far apart for all values of tension acting on the string within the measuring range.

The cross sections illustrated in FIGURES 4a, 4b and the rectangular cross section illustrated in FIGURE 5 all contain at least one face which is parallel to one of the bisecting diameters of the ellipse of gyration, a circumstance which facilitates clamping the string correctly orientated with reference to the plane of excitation.

Other examples are given in FIGURES 6 and 7, FIGURE 6 showing a cross section of a string of continuous rhombic or rhomboidal cross section save its corners bisected by the $x$-plane are rounded, and FIGURE 7 showing a cross section of a string of continuous acute-angled triangular cross section save the acute corner is rounded. In these embodiments the position of the ellipse of gyration and the orientation of the string is likewise clearly determinable.

Since the stiffness of the string quietly increases with higher vibratory modes it is possible, if the cross section of the string is too flat, for the desired vibration (say the third mode in $x$-direction or in the direction of the major moment of inertia) to have the same frequency as the next higher mode (say the fourth mode in $y$-direction or in the direction of the minor moment of inertia). If a vibration in $y$-direction, i.e., in the direction of the minor moment of inertia is desired, then the possibility of the next lower mode in $x$-direction having the same frequency must be avoided. The permissible limit of the intentional difference between the radii of gyration of noncircular sections can be calculated or, as above mentioned, determined by experiment.

It has so far been assumed that the cross section of the proposed string is uniform throughout its entire length. However, this is by no means necessary. A string which is intended to vibrate in the third mode may have two different cross sections along its length, for instance as illustrated in FIGURES 8 to 10. The originally non-circular section (a) has been allowed to remain only at the nodal points of the vibration, whereas the cross section (b) is flat at the points of maximum amplitude and the points of fixation. Stiffness and resonant frequencies in the $x$-direction and $y$-direction are therefore different.

Alternatively and as illustrated in FIGURES 11 to 14, only the ends of the string may be non-circular for the purpose of providing the desired frequency spacing. The middle part (e) and the fixing heads (c) are of round cross section, whereas at the transitions between the heads a flat cross section (d) is created by the provision of two flats. Whenever the cross section of the string differs in the manner described above, the ratio of the two axes of the mean ellipse of gyration determines the two vibratory frequencies.

We claim:

1. A string for measurement purposes adapted to vibrate in a given plane in which the ratio of the axes of the mean ellipse of gyration of the cross section along the length of the string is such that in the measuring range two resonant frequencies of the same order in the direction of said axes, one of which is used for the measurement, differ by more than their resonance band width though remaining between the resonant frequencies of the next higher and next lower orders.

2. A string according to claim 1, characterized in that the string has a continuous circular section flattened on one side.

3. A string according to claim 1, characterized in that the string has a continuous cross section flattened on opposite sides.

4. A string according to claim 1, characterized in that the string has a continuous rectangular section.

5. A string according to claim 1, characterized in that the string has a continuous rhombic cross section.

6. A string according to claim 1, characterized in that the string has a continuous acute-angled triangle cross section.

7. A string according to claim 1 in which the cross section is uniform along at least part of the length of the string.

References Cited

UNITED STATES PATENTS

| | | | |
|---|---|---|---|
| 210,172 | 11/1878 | Watson et al. | 84—199 |
| 579,031 | 3/1897 | Zintzsch | 84—404 |
| 1,301,916 | 4/1919 | Deagan | 84—403 |
| 1,948,104 | 2/1934 | Firestone et al. | 73—70.2 XR |
| 2,552,650 | 5/1951 | Rawlings | 73—505 XR |
| 2,581,963 | 1/1952 | Langloys | 84—409 XR |

RICHARD C. QUEISSER, *Primary Examiner.*

C. A. RUEHL, *Assistant Examiner.*